(12) United States Patent
Budni et al.

(10) Patent No.: US 11,349,276 B1
(45) Date of Patent: May 31, 2022

(54) ULTRA-SHORT PULSE MID AND LONG WAVE INFRARED LASER

(71) Applicant: BAE SYSTEMS Information and Electronic Systems Integration Inc., Nashua, NH (US)

(72) Inventors: Peter A. Budni, Nashua, NH (US); Alan R. Enman, Merrimack, NH (US); Yannick C. Morel, Falls Church, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/109,582

(22) Filed: Dec. 2, 2020

(51) Int. Cl.
| | |
|---|---|
| *H01S 3/23* | (2006.01) |
| *H01S 3/11* | (2006.01) |
| *H01S 3/091* | (2006.01) |
| *H01S 3/102* | (2006.01) |
| *H01S 3/00* | (2006.01) |

(52) U.S. Cl.
CPC .............. *H01S 3/11* (2013.01); *H01S 3/0057* (2013.01); *H01S 3/0092* (2013.01); *H01S 3/091* (2013.01); *H01S 3/1024* (2013.01); *H01S 3/2308* (2013.01)

(58) Field of Classification Search
CPC ...... H01S 3/0057; H01S 3/0092; H01S 3/091; H01S 3/11; H01S 3/2308
See application file for complete search history.

(56) References Cited

U.S. PATENT DOCUMENTS

| | | |
|---|---|---|
| 6,181,463 B1 | 1/2001 | Galvanauskas et al. |
| 7,239,653 B2 | 7/2007 | Setzler |
| 7,733,926 B2 | 6/2010 | Pomeranz |
| 8,379,296 B2 | 2/2013 | Schunemann et al. |
| 8,599,889 B2 | 12/2013 | Biegert et al. |
| 8,995,494 B1 | 3/2015 | Pomeranz et al. |
| 9,069,229 B2 | 6/2015 | Schunemann et al. |
| 9,407,059 B2 | 8/2016 | Pomeranz et al. |

(Continued)

FOREIGN PATENT DOCUMENTS

| | | |
|---|---|---|
| EP | 1530744 A2 | 5/2005 |
| EP | 1530744 B1 | 4/2009 |

OTHER PUBLICATIONS

S. Cheng et al., Compact Ho:YLF-pumped ZnGeP2-based optical parametric amplifiers tunable in the molecular fingerprint regime, Apr. 15, 2020, Optics Letters, vol. 45, No. 8, pp. 2255-2258 . . . (Year: 2020).*

(Continued)

*Primary Examiner* — Michael Carter
(74) *Attorney, Agent, or Firm* — KPIP Law, PLLC

(57) ABSTRACT

The system and method of using an ultra-short pulse mid and long wave infrared laser. The system is seeded with a 2 μm laser source having a pulse duration in the femtosecond range. The beam is stretched, to increase the pulse duration, and the beam is amplified, to increase an energy level of the laser beam. Both mid wave IR and long wave IR seed beams are first generated, and then amplified via one or more optical parametric chirped-pulse amplification stages. A compressor may be used to compress one or more of the output beams to achieve high peak power and controllable pulse duration in the output beams. The output beams may then be used to create atmospheric or material effects at km range.

20 Claims, 3 Drawing Sheets

(56) References Cited

U.S. PATENT DOCUMENTS

| | | |
|---|---|---|
| 10,104,756 B1 | 10/2018 | Chang et al. |
| 10,274,809 B1 | 4/2019 | Pomeranz et al. |
| 10,852,432 B2 | 12/2020 | Kelly et al. |
| 2005/0271094 A1 | 12/2005 | Miller et al. |
| 2009/0244695 A1* | 10/2009 | Marcinkevicius ........ G02F 1/39 359/340 |
| 2010/0074281 A1 | 3/2010 | Pomeranz |
| 2011/0054451 A1 | 3/2011 | Schunemann et al. |
| 2013/0158528 A1 | 6/2013 | Schunemann et al. |
| 2015/0171590 A1 | 6/2015 | Pomeranz et al. |
| 2018/0138652 A1 | 5/2018 | Kelly et al. |

OTHER PUBLICATIONS

Von Grafenstein, 5 μm few-cycle pulses with multi-gigawatt peak power at a 1 kHz repetition rate, Oct. 1, 2017, Optics Letters, vol. 42, No. 19, pp. 3796-3799. (Year: 2017).*

S. L. Chin et al., Advances in Intense Femtosecond Laser Filamentation in Air, Laser Physics vol. 22 No. 1 2012.

D. J. Cook, et al., Intense terahertz pulses by four-wave rectification in air, Optics Letters, vol. 25, No. 16, Aug. 15, 2000.

V. Y. Federov et al., Extreme THz fields from two-color filamentation of midinfrared laser pulses, Physical Review A 97, 063842 (2018).

P. Xia et al., Generation of sub-two-cycle CEP-stable optical pulses at 3.5 μm by multiple-plate pulse compression for high-harmonic generation in crystals, EPJ Web of Conferences 205, 01006 (2019) https://doi.org/10.1051/epjconf/20192050100.

J. Zhang et al., Kerr-Lens Mode-Locked 2-μm Thin-Disk Lasers, IEEE Journal of Selected Topics in Quantum Electronics, vol. 24, No. 5, Sep./Oct. 2018.

S. Cheng et al., Compact Ho:YLF-pumped ZnGeP2-based optical parametric amplifiers tunable in the molecular fingerprint regime, Optics Letters, vol. 45, No. 8, Apr. 15, 2020.

J. Zhang et al., Multi-mW, few-cycle mid-infrared continuum spanning from 500 to 2250cm—1,Light: Science & Applications (2018) 7, 17180.

G. Andriukaitis et al., 90 GW peak power few-cycle mid-infrared pulses from an optical parametric amplifier, Optics Letters, vol. 36, No. 15, Aug. 1, 2011.

International Search Report, PCT/US21/60947, dated Feb. 22, 2022, 11 pages.

* cited by examiner

ULTRA-SHORT PULSE MID AND LONG WAVE INFRARED LASER

STATEMENT OF GOVERNMENT INTEREST

The invention claimed in this patent application was made with U.S. Government support under contract No. N00014-21-C-1055 awarded by the Office of Naval Research. The U.S. Government has certain rights in the invention.

FIELD OF THE DISCLOSURE

The present disclosure relates to infrared lasers and more particularly to an ultra-short pulse mid and long wave infrared laser.

BACKGROUND OF THE DISCLOSURE

It is understood that currently there are few laser architectures available for the mid wave infrared (IR) portion of the spectrum that are ultra-short pulse lasers (USPL). These conventional solutions are typically based on Ti: sapphire lasers or fiber lasers operating at wavelength around 1 um. These lasers are then frequency converted to the mid wave IR portion of the spectrum by non-linear optical processes, and in some cases, further amplified. These non-linear optical (NLO) conversion processes have low efficiency for seeds at or near 1 μm due to the high quantum defect, and low nonlinear coefficient of the NLO materials for conversion from the near infra-red. As such, most systems available produce low energy in the mid wave IR, typically in the low μJ range. It is difficult to reach a high energy per pulse (mJ range) and/or a high average power in these systems without adding many amplification stages, which make for cumbersome and delicate systems. Also, many NLO crystals, such as GaSe or AgGaSe for example, frequently used for converting 1 μm sources to mid wave IR or longer wavelengths are limited by parasitic effects such as 2 and 3-photon absorption when used with high pump power at ~1 μm.

Wherefore it is an object of the present disclosure to overcome the above-mentioned shortcomings and drawbacks associated with the conventional ultra-short pulse lasers available for mid wave infrared applications.

SUMMARY OF THE DISCLOSURE

One aspect of the present disclosure is an ultra-short pulse infrared laser, comprising: a 2 μm laser source having a pulse duration in the less than 500 femtosecond range; a stretcher to increase the pulse duration of the 2 μm laser to a stretched pulse duration; one or more amplifier stages to increase an energy level of the stretched pulse 2 μm laser; a nonlinear frequency conversion stage for generation of mid wave IR or long wave IR seed beams; an optical parametric chirped-pulse amplification stage for amplification of the mid wave IR or long wave IR beams; and a compressor for controlling and compressing a resulting pulse duration in the mid wave IR or long wave IR beams.

One embodiment of the ultra-short pulse infrared laser is wherein the mid wave IR is 3-8 μm and the long wave IR is 8-12 μm.

Another embodiment of the ultra-short pulse infrared laser is wherein the pulse duration is about 100 fs with energy in the 10 s of mJ range, resulting in high peak power. In some cases, the resulting pulse duration is in the femto, pico or nano second range.

Yet another embodiment of the ultra-short pulse infrared laser is wherein the laser is a switchable spectrum emitting laser spanning the mid wave IR and the long wave IR spectral domains. In certain embodiments, the optical parametric chirped-pulse amplification stage comprises a non-linear optical element. In some cases, the non-linear optical element comprises a ZGP crystal and amplifies a beam in the range 3-8 μm.

Still yet another embodiment of the ultra-short pulse infrared laser is wherein the controllable pulse duration enables the beams to create atmospheric or material effects at km range.

Another aspect of the present disclosure is an ultra-short pulse infrared laser, comprising: a 2 μm laser source having a pulse duration in the less than 500 femtosecond range; a stretcher to increase the pulse duration of the 2 μm laser to a stretched pulse duration; one or more amplifier stages to increase an energy level of the stretched pulse 2 μm laser; a nonlinear frequency conversion stage for generation of mid wave IR and long wave IR seed beams; an optical parametric chirped-pulse amplification stage for amplification of both mid wave IR and long wave IR beams; and a compressor for controlling and compressing a resulting pulse duration in the mid wave IR and long wave IR beams, wherein one beam at about 3.8 μm is used to create atmospheric or material effects and a second beam at 4.6 μm is used for ranging, or atmospheric turbulence compensation.

One embodiment of the ultra-short pulse infrared laser is wherein the mid wave IR is 3-8 μm and the long wave IR is 8-12 μm. In certain embodiments, the resulting pulse duration is about 100 fs with energy in the 10 s of mJ range. In some cases, the resulting pulse duration is in the femto, pico or nano second range.

Another embodiment of the ultra-short pulse infrared laser is wherein the laser is a switchable spectrum emitting laser spanning the mid wave IR and the long wave IR spectral domains.

Yet another embodiment of the ultra-short pulse infrared laser is wherein the optical parametric chirped-pulse amplification stage comprises a non-linear optical element. In some cases, the non-linear optical element comprises a ZGP crystal and amplifies a beam in the range 3-8 μm.

Still yet another embodiment of the ultra-short pulse infrared laser is wherein the controllable pulse duration enables the output beams to create atmospheric or material effects at km range.

Yet another aspect of the present disclosure is a method of using an ultra-short pulse infrared laser system, comprising: seeding the system with a 2 μm laser source having a pulse duration in the less than 500 femtosecond range; stretching a beam, via a stretcher, to increase the pulse duration of the 2 μm laser to a stretched pulse duration; amplifying the stretched pulse duration beam, via one or more amplifier stages, to increase an energy level of the stretched pulse duration 2 μm laser beam; a nonlinear frequency conversion stage for generation of mid wave IR and/or long wave IR seed beams; an optical parametric chirped-pulse amplification stage for amplification of the mid wave IR and/or long wave IR beams; and compressing and controlling, via a compressor, a resulting pulse duration in the mid wave IR and/or long wave IR beams resulting mid wave IR and/or long wave IR beams to achieve a high peak power.

One embodiment of the method of using an ultra-short pulse infrared laser system further comprises forming a switchable spectrum emitting laser spanning the mid wave IR and the long wave IR spectral domains.

Another embodiment of the method of using an ultra-short pulse mid and long wave infrared laser system further comprises creating atmospheric or material effects with the output beams at km range.

Yet another embodiment of the method of using an ultra-short pulse infrared laser is wherein the resulting pulse duration is about 100 fs and energy is in the 10 s of mJ range.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
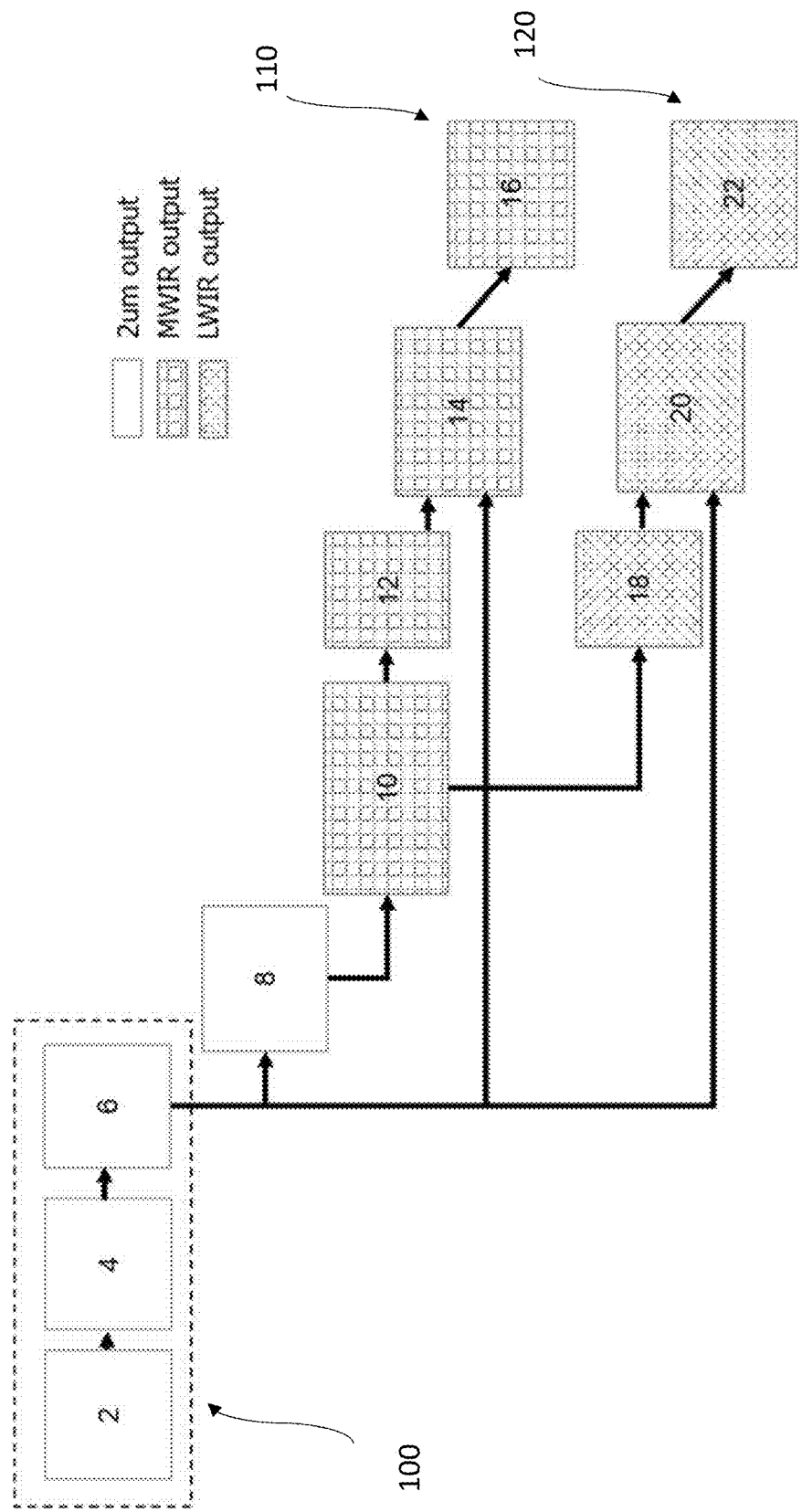
FIG. 1 is a diagrammatic view of one embodiment of an ultra-short pulse mid and/or long wave infrared laser according to the principles of the present disclosure.

Some NLO crystals exhibit broader phase matching bandwidth at 2 µm. Thus, much higher conversion efficiencies to the mid wave IR can be expected by pumping NLO crystals directly with a 2 µm source. Higher conversion efficiencies are expected for the 2 µm seed as compared to a 1 µm (800-1100 nm) source due, in part, to lower quantum defects, high nonlinear optical responses, and less stringent phase matching conditions. In some cases, the system of the present disclosure provides for lower dispersion for broadband/short pulse signals.

One embodiment of the present disclosure is a system for generating laser pulses in the mid-wave IR portion of the spectrum that have a high energy per pulse, typically up to 10 s of mJ. In one embodiment, an ultra-short pulse laser (USPL) architecture, with pulse duration in the <100 fs to several ps range is possible from about a 2 µm wavelength source. In some cases, a 2 µm wavelength source is used as seed for frequency conversion to the mid wave IR (3-8 µm) and the long wave IR (8-12 µm) portions of the spectrum. In certain embodiments, the 2 µm source has a high peak power (high energy/short pulse duration) and is used as a pump for optical parametric chirped-pulse amplification (OPCPA).

It is understood that the concept of chirped-pulse amplification is suitable for optical parametric amplifiers (OPAs). At high pulse energies, these systems also benefit from a large reduction in the peak intensities by amplifying temporally stretched (chirped) pulses. Stretching signals to chirped signal pulse durations of the order of 100 s of ps to ns makes it possible to extract more energy from the amplifiers as the damage threshold of the optical components is higher than at short pulses (<1 ps), which makes for more compact systems. Typically, in this pulse width regime, the damage threshold scales with the square root of the pulse duration. So, for a 100 ps pulse, it is expected that the damage threshold is about 10 times higher than for a 1 ps pulses. Thus, a single amplifier with a stretched pulse can produce up to 10 times more energy than its shorter pulse counterpart.

One embodiment of the present disclosure is a laser architecture based on a 2 micron (µm) pump source pumping a nonlinear frequency conversion stage such as an optical parametric oscillator, to generate an ultra-short pulse seed laser at other wavelengths via frequency down conversion. This laser architecture is based on a 2-micron source pumping one or more nonlinear optical parametric devices configured in an optical parametric chirped-pulse amplification (OPCPA) architecture to amplify the down converted seed beams.

One embodiment of the laser of the present disclosure has output in the 4 µm range (i.e., the mid wave IR) and/or the 10 µm (i.e., the long wave IR) range. In certain embodiments, the output energy is strong enough that when focused it ionizes air and/or materials and creates localized electromagnetic pulses (EMP). In some cases, these EMP can be used to disable or disrupt electronic components, for example. In certain embodiments of the laser of the present disclosure, the ultra-short pulses are in the 100 fs range.

Referring to FIG. 1, a diagrammatic view of one embodiment of an ultra-short pulse mid and/or long wave infrared laser according to the principles of the present disclosure is shown. More specifically, a 2 µm wavelength source is used as a common source/seed 100 for multiple frequency bands (110, 120). This architecture is applicable to other temporal regimes by removing stretcher/compressor stages. There, the energy may remain constant, but the peak power can be varied with stretching and compression. In one embodiment of the present disclosure, the fs-ns pulse width regime is addressed. Higher conversion efficiencies to the mid wave and long wave IR are expected for the 2 µm seed as compared to a ~1 µm (800-1100 nm) source due, in part, to lower quantum defects, higher nonlinear optical responses of materials, and less stringent phase matching conditions.

In some cases, the system of the present disclosure allows for better propagation of the laser beams through the atmosphere as it takes advantage of the lower dispersion of air at these wavelengths. This is essential to maintain the broadband and short pulse duration characteristics of the laser beam as it propagates. It also allows retaining the temporal profile of the laser pulse for longer range (several km range) than that of a 1 µm source. The longer wavelengths thus allow for high power atmospheric transmission in contrast to a 0.8 µm spectral source.

Still referring to FIG. 1, the common 2 µm wavelength seed source 100 simplifies synchronization and temporal overlap of pump and seed signals for OPCPA amplifiers as the pump and signal beams of the OPCPA are coming from the same 2 µm front end unit. In some cases, the resulting architecture is also compact due to the reduced laser complexity. An ultra-short pulse laser oscillator 2 operates at about 2 µm wavelength in about the 100 fs range. These signals are fed into a pulse stretcher 4 at 2 µm and are stretched to the 200 ps to 1 ns stretched pulse range. The signals are then amplified 6 at the 2 µm range, within the 2 µm source 100. The energy is compressed via a 2 µm compressor 8. This stretching and compressing is known as chirp-pulse amplification. A stretcher is useful so that amplification can be done on longer pulses and avoid damaging effects to the optical system. The compression step provides for a strong pulse in ultra-short (e.g. femtosecond) pulse lengths. In some cases, these high-power, ultra-short pulses can be used to create atmospheric or material effects at long ranges. The compressor stage can be used to control the pulse duration by tuning the compressor to select various pulse lengths such as 1 ps or 100 fs. In some cases, the compressor may be untuned and result in a 10 ps pulse.

The output from the 2 µm compressor 8 is fed into a non-linear optical element (NLO) 10 (e.g., crystal). The incoming signal is focused on the crystal and depending on how the crystal is oriented, it produces wider band signal via frequency down conversion. Here going from a 2 µm signal to longer wavelengths (e.g., around 4 µm or 10 µm). The signals after being subjected to the NLO are fed into either a first path (e.g. MWIR) or a second path (e.g., LWIR). In this embodiment, the first path comprises a pulse stretcher 12 for the mid wave IR signal, an OPCPA amplifier 14, and a MWIR compressor 16 for the mid wave IR portion of the spectrum. The OPCPA amplifier 14 is coupled to the amplified 2 µm signal from amplifier 6. In certain embodiments, the OPCPA for the MWIR path comprises a ZGP crystal and amplifies signal wavelengths in the range 2-8 µm. It is understood that various NLO beyond ZGP are applicable depending on the incoming wavelength and desired output.

The second path comprises a pulse stretcher 18 for the long wave IR signal, an OPCPA amplifier 20, and a LWIR compressor 22 for the long wave IR portion of the spectrum. The OPCPA amplifier 20 is coupled to the amplified 2 µm signal from amplifier 6. In certain embodiments, the OPCPA for the LWIR path amplifies 8-12 µm wavelengths.

Figure 2:
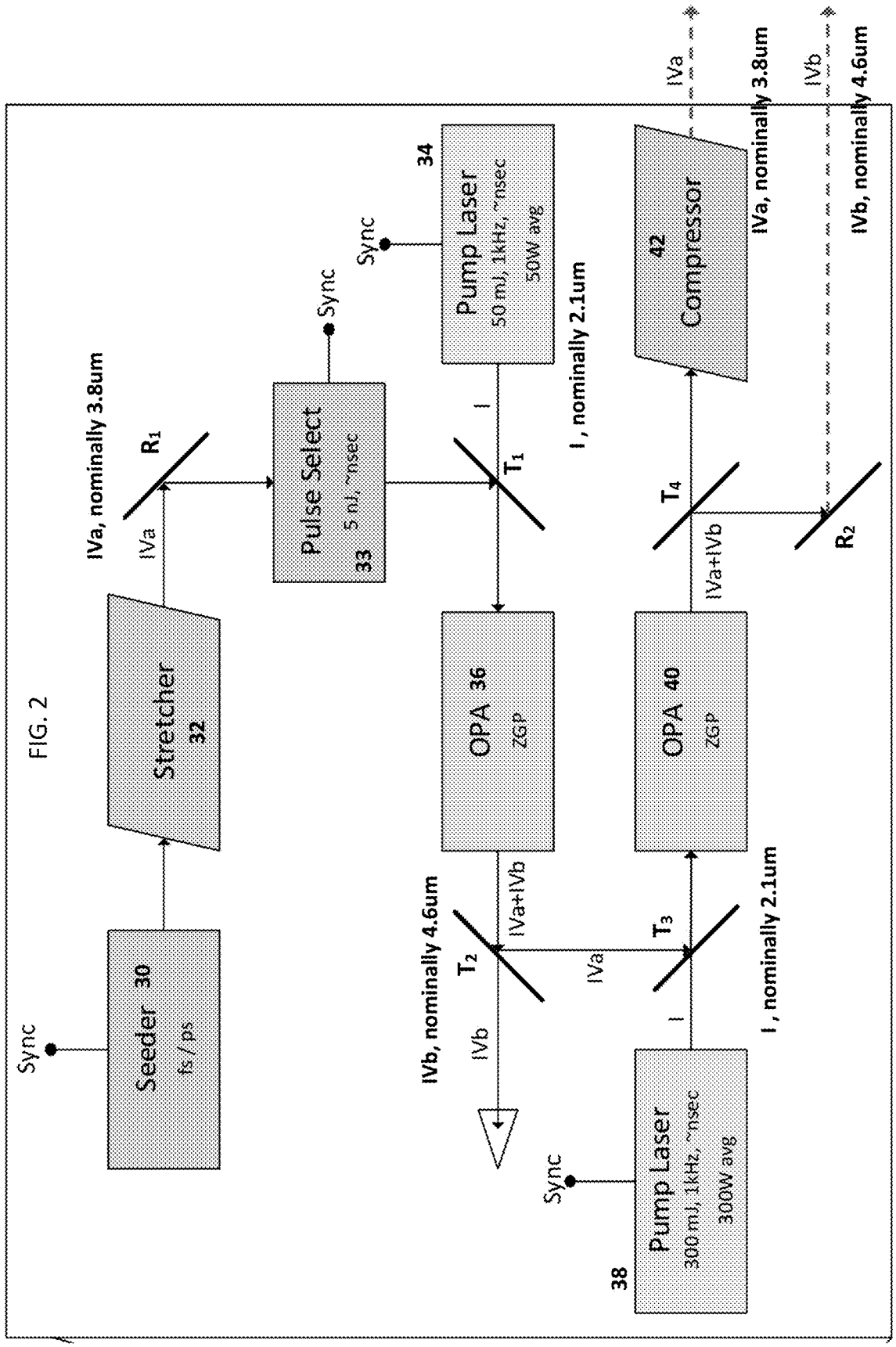
FIG. 2 is a diagrammatic view of one embodiment of an ultra-short pulse mid and/or long wave infrared laser according to the principles of the present disclosure.

Referring to FIG. 2, another diagrammatic view of one embodiment of an ultra-short pulse mid and/or long wave infrared laser according to the principles of the present disclosure is shown. More specifically, an ultra-short pulse seed laser 30 in the femtosecond range is passed through a stretcher 32, as described previously, and emits a beam of about 5 nJ in the nanosecond range in a first wavelength range (IVa, nominally 3.8 µm). The beam is reflected off mirror $R_1$ and passed through a pulse select module 33.

A 2 µm pump laser 34 injects energy at about 50 mJ, 1 kHz, in the nanosecond range with 50 W average power to amplify the seed beam reflected from mirror $R_1$ as it enters a first OPCPA stage 36 through a partially transmissive mirror $T_1$. The first OPCPA stage amplifies the seed beam at the first wavelength range (IVa 3.8 µm) and produces a second wavelength range (IVb, nominally 4.6 µm). The combined IVa and IVb output of the first OPCPA 36 is incident upon a partially transmissive mirror $T_2$ and provides an IVb output and an IVa output, where the IVa output from mirror $T_2$ is reflected by partially transmissive mirror $T_3$ to the OPCPA stage 40 along with the laser source 38. In this embodiment, a second 2 µm pump laser 38 injects energy at about 300 mJ, 1 kHz, in the nanosecond range with 300 W average power to further amplify the seed beam into a second OPCPA stage 40 that produce output at the first wavelength range (IVa 3.8 µm) and the second wavelength range (IVb 4.6 µm). The combined IVa and IVb beams are incident upon partially transmissive mirror $T_4$ and IVb is then reflected by mirror $R_2$. The IVa beams from mirror $T_4$ may then be compressed 42 to produce higher peak output power as the peak power represents the average power divided by the time so for smaller pulses the peak power is increased. It is to be understood that two wavelengths can be produced from a 2 µm pump. In some cases, the two wavelengths are in the MWIR (e.g., 3-8 µm) as in this example, the LWIR (e.g., 8-14 µm), or both.

Figure 3:
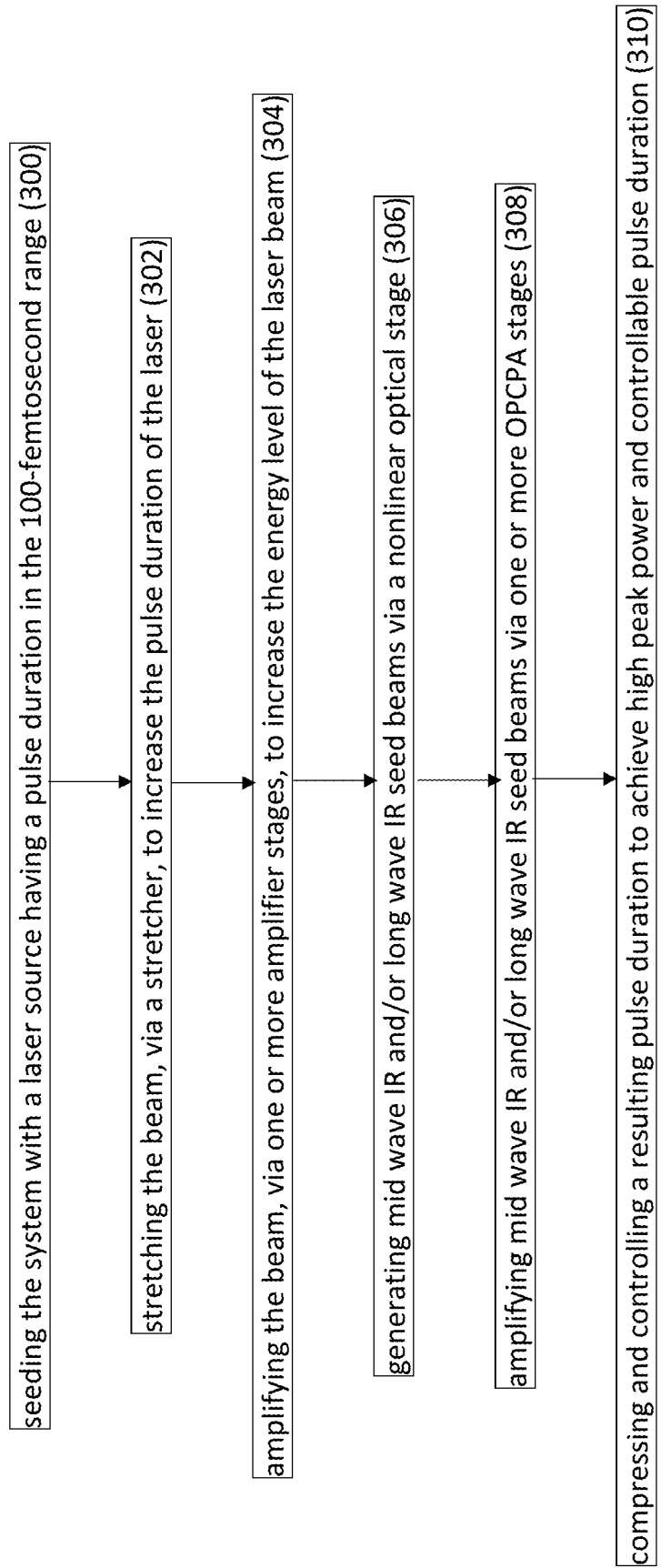
FIG. 3 shows a flowchart of one embodiment of a method of using an ultra-short pulse mid and/or long wave infrared laser according to the principles of the present disclosure.

Referring to FIG. 3, a flowchart of one embodiment of a method of using an ultra-short pulse mid and/or long wave infrared laser according to the principles of the present disclosure is shown. More specifically, one embodiment of the method of using the system seeds the system with a 2 µm laser source having a pulse duration in the 100-femtosecond range 300. The beam is stretched, via a stretcher, to increase the pulse duration of the 2 µm laser 302 to a stretched pulse and the beam is amplified, via one or more amplifier stages, to increase an energy level of the stretched pulse 2 µm laser beam 304. In one embodiment, part of the 2 µm beam is used to generate mid wave IR and long wave IR wavelengths seed beams, via a nonlinear optical process 306. In this embodiment, the other part of the 2 µm beam is used to amplify the mid wave IR or long wave IR seeds in one or more optical parametric chirped-pulse amplification stages 308. A compressor may be used to compress one or more of the output beams to achieve high peak power and controllable pulse duration in the output beams 310. The output beams are controllable by tuning the compressor to get a desired pulse length. In one embodiment, a femtosecond pulse provides a terawatt high peak power. In some cases, the ultra-short pulse is <500 fs. In some cases, the high peak power is >$10^{12}$ W.

In one example the output can be used to create atmospheric or material effects at km range. For example, the beams can ionize and create localized electromagnetic pulses to disrupt or disable certain electronics.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An ultra-short pulse infrared laser, comprising:
    a 2 μm laser source having a pulse duration in the less than 500 femtosecond range;
    a stretcher to increase the pulse duration of the 2 μm laser to a stretched pulse duration;
    one or more amplifier stages to increase an energy level of the stretched pulse 2 μm laser;
    a nonlinear frequency conversion stage for generation of mid wave IR or long wave IR seed beams;
    an optical parametric chirped-pulse amplification stage for amplification of the mid wave IR or long wave IR beams; and
    a compressor for controlling and compressing a resulting pulse duration in the mid wave IR or long wave IR beams.

2. The ultra-short pulse infrared laser according to claim 1, wherein the mid wave IR is 3-8 μm and the long wave IR is 8-12 μm.

3. The ultra-short pulse infrared laser according to claim 1, wherein the pulse duration is about 100 fs with energy in the 10 s of mJ range, resulting in high peak power.

4. The ultra-short pulse infrared laser according to claim 1, wherein the resulting pulse duration is in the femto, pico or nano second range.

5. The ultra-short pulse infrared laser according to claim 1, wherein the laser is a switchable spectrum emitting laser spanning the mid wave IR and the long wave IR spectral domains.

6. The ultra-short pulse infrared laser according to claim 1, wherein the optical parametric chirped-pulse amplification stage comprises a non-linear optical element.

7. The ultra-short pulse infrared laser according to claim 6, wherein the non-linear optical element comprises a ZGP crystal and amplifies a beam in the range 3-8 μm.

8. The ultra-short pulse infrared laser according to claim 1, wherein the controllable pulse duration enables the beams to create atmospheric or material effects at km range.

9. An ultra-short pulse infrared laser, comprising:
    a 2 μm laser source having a pulse duration in the less than 500 femtosecond range;
    a stretcher to increase the pulse duration of the 2 μm laser to a stretched pulse duration;
    one or more amplifier stages to increase an energy level of the stretched pulse 2 μm laser;
    a nonlinear frequency conversion stage for generation of mid wave IR and long wave IR seed beams;
    an optical parametric chirped-pulse amplification stage for amplification of both mid wave IR and long wave IR beams; and
    a compressor for controlling and compressing a resulting pulse duration in the mid wave IR and long wave IR beams,
    wherein one beam at about 3.8 μm is used to create atmospheric or material effects and a second beam at 4.6 μm is used for ranging, or atmospheric turbulence compensation.

10. The ultra-short pulse infrared laser according to claim 9, wherein the mid wave IR is 3-8 μm and the long wave IR is 8-12 μm.

11. The ultra-short pulse infrared laser according to claim 9, wherein the resulting pulse duration is about 100 fs with energy in the 10 s of mJ range.

12. The ultra-short pulse infrared laser according to claim 9, wherein the resulting pulse duration is in the femto, pico or nano second range.

13. The ultra-short pulse infrared laser according to claim 9, wherein the laser is a switchable spectrum emitting laser spanning the mid wave IR and the long wave IR spectral domains.

14. The ultra-short pulse infrared laser according to claim 9, wherein the optical parametric chirped-pulse amplification stage comprises a non-linear optical element.

15. The ultra-short pulse infrared laser according to claim 14, wherein the non-linear optical element comprises a ZGP crystal and amplifies a beam in the range 3-8 μm.

16. The ultra-short pulse infrared laser according to claim 9, wherein the controllable pulse duration enables the output beams to create atmospheric or material effects at km range.

17. A method of using an ultra-short pulse infrared laser system, comprising:
    seeding the system with a 2 μm laser source having a pulse duration in the less than 500 femtosecond range;
    stretching a beam, via a stretcher, to increase the pulse duration of the 2 μm laser to a stretched pulse duration;
    amplifying the stretched pulse duration beam, via one or more amplifier stages, to increase an energy level of the stretched pulse duration 2 μm laser beam;
    generating via a nonlinear frequency conversion stage mid wave IR and/or long wave IR seed beams;
    utilizing an optical parametric chirped-pulse amplification stage for amplification of the mid wave IR and/or long wave IR beams; and
    compressing and controlling, via a compressor, a resulting pulse duration in the mid wave IR and/or long wave IR beams resulting mid wave IR and/or long wave IR beams to achieve a high peak power.

18. The method of using an ultra-short pulse infrared laser system according to claim 17, further comprising forming a switchable spectrum emitting laser spanning the mid wave IR and the long wave IR spectral domains.

19. The method of using an ultra-short pulse mid and long wave infrared laser system according to claim 17, further comprising creating atmospheric or material effects with the output beams at km range.

20. The method of using an ultra-short pulse infrared laser according to claim 17, wherein the resulting pulse duration is about 100 fs and energy is in the 10 s of mJ range.

* * * * *